Figure 1:
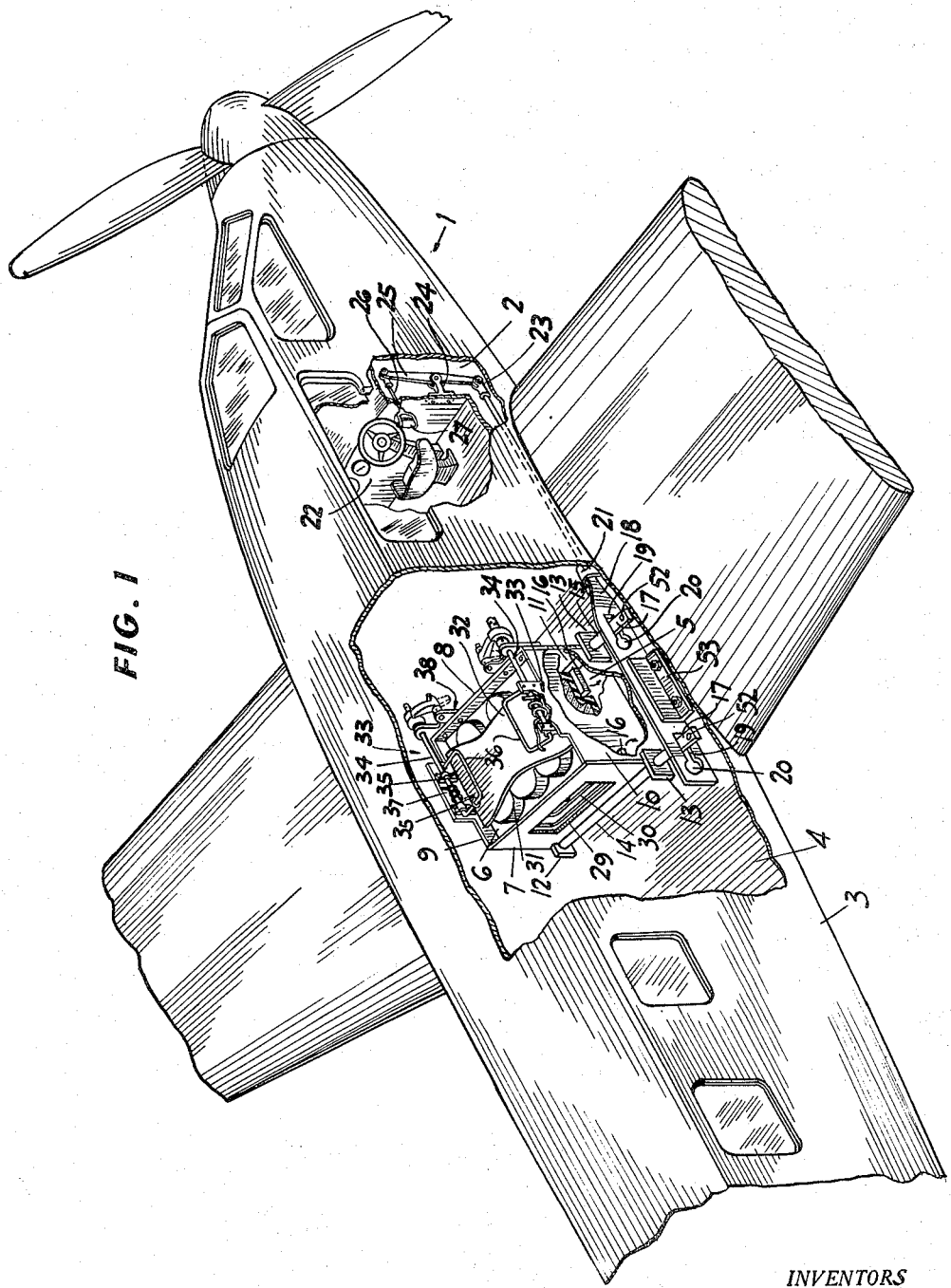

Aug. 20, 1935.   A. A. SCHWERIN ET AL   2,011,950
CARGO RELEASING DEVICE FOR AIRCRAFT
Filed Feb. 27, 1934   2 Sheets-Sheet 1

INVENTORS
ALBERT A. SCHWERIN
STANLEY J. BENTLEY
BY
ATTORNEY

Aug. 20, 1935.   A. A. SCHWERIN ET AL   2,011,950
CARGO RELEASING DEVICE FOR AIRCRAFT
Filed Feb. 27, 1934   2 Sheets-Sheet 2
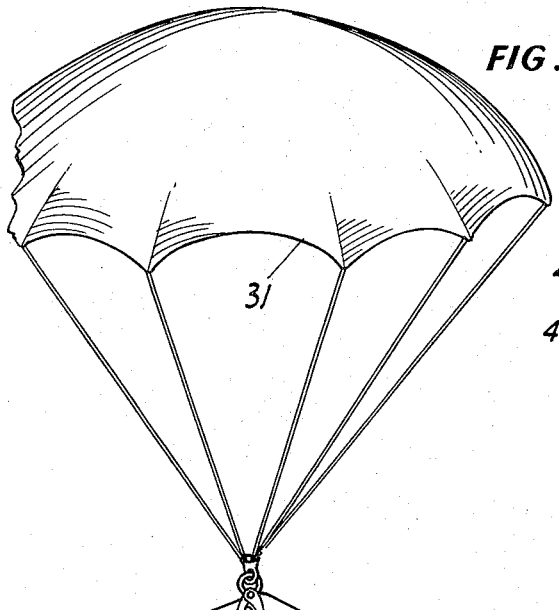
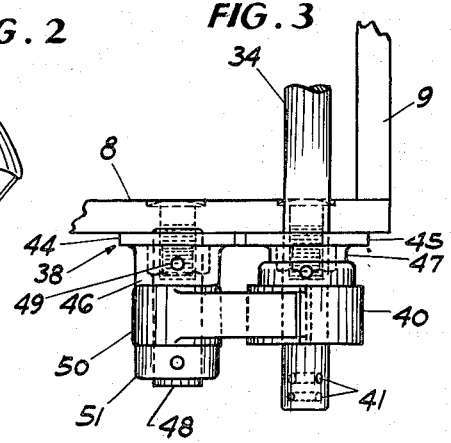
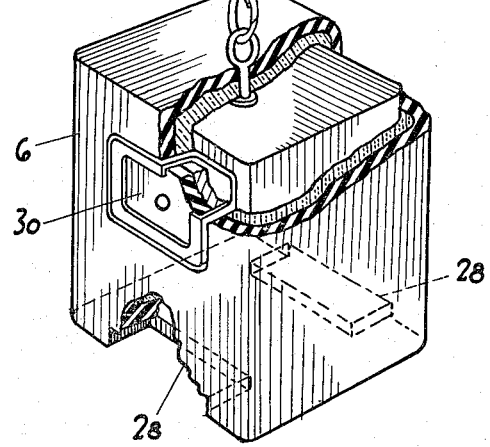
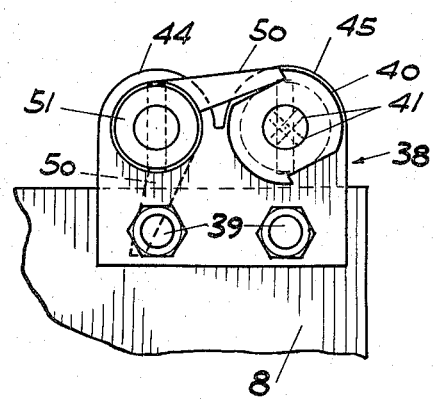
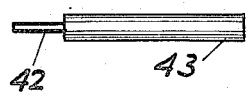
INVENTORS
ALBERT A. SCHWERIN
STANLEY J. BENTLEY
BY
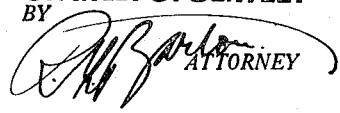
ATTORNEY Patented Aug. 20, 1935

2,011,950

UNITED STATES PATENT OFFICE 2,011,950

CARGO RELEASING DEVICE FOR AIRCRAFT

Albert A. Schwerin, Kingman, Ariz., and Stanley J. Bentley, Kittanning, Pa.

Application February 27, 1934, Serial No. 713,146

5 Claims. (Cl. 244—21)

The present invention relates to means by which objects more particularly mail, may be released from aircraft in case of an emergency.

It is an important object of the invention to provide for the discharge and safe delivery of objects carried by aircraft where no landing fields are available or where incidents beyond control necessitate the forced delivery of the same.

A further object of the invention is to improve upon the manner of supporting the object to be quickly released and the means initiating the quick ejection thereof when it is once subjected to the unrestrained force of gravity.

A still further object of the invention is to provide a suitable compartment wherein to house a receptacle for the storage of air mail so that the base of the receptacle may be utilized to form the floor of the compartment of the aircraft and thus contribute to minimize unnecessary resistances due to air drag, and producing as much of a streamline effect as possible at that point.

Yet another object of the invention is to provide a novel and improved supporting and releasing mechanism operable from the pilot's compartment whereby the means providing for the support of the object may be converted into a release by simply adjusting the position of a control lever.

Still another object of the invention is to provide a semi-rotatable or rockable member for supporting an object for release from aircraft which in addition to being influenced by the force of gravity is provided with a novel expelling rat-trap spring mechanism.

Finally, it is a further object of the invention to provide novel means for holding the rat-trap spring mechanism in a retractable position during the inserting of the object in the compartment in readiness for expulsion.

These objects are attained by mechanism illustrated in the accompanying drawings, and altho only one embodiment of the invention is shown, it is to be understood certain deviations are permissible as may be defined by the latitude of what is claimed.

In the accompanying drawings: Fig. 1 is a fragmentary perspective view of an aeroplane having a portion of its body broken away to disclose one adaptation of the invention thereto; Fig. 2 is a perspective view of the descending object some parts being shown in section whereby to disclose underlying structure; Fig. 3 is a fragmentary plan view showing the pawl and ratchet mechanism for holding the ejective spring in retracted position while the receptacle is being installed, in the ejection chamber; Fig. 4 is an end elevation of the mechanism shown in Fig. 3; and Fig. 5 is a side elevation of an operating tool.

Referring in detail to the several figures, the numeral 1 refers in general to an aeroplane having a portion 2 of its fuselage 3 broken away to disclose the parts for operating the device and a portion 4 broken away to disclose the operative position of the device.

In the floor of the fuselage 3 I provide an opening 5 the area of which is substantially equal to the basal area of the receptacle or mail container 6 which is to be contained in said opening. Around said opening are constructed the walls 7, 8, 9 and 10 which enclose a compartment 11 for storing the receptacle 6 until such time as an emergency might arise which would necessitate the premature dropping of the receptacle and its contents before the aeroplane could be safely landed.

To the floor of the fuselage and to the walls at the four corners of the compartment thus provided are secured like bearing blocks or trunnions 12 and 13 wherein are journalled the shafts 14 and 15. Said shafts are in turn provided with laterally extending parts 16 for releasably supporting the weight and contents of the receptacle 6. A portion of each shaft 14 and 15 extends thru the bearings 13 and is flattened, and on each flattened portion, designated by the number 17, is mounted an operating link 18 manually controllable from the pilot's compartment.

The operating link 18 is provided with spaced slots 19 wherein the flattened portions 17 of the shafts 14 and 15 are slidingly mounted. The slots 19 have rounded terminal portions 20 which correspond in size to a diameter approximately equal to that of the breadth of said flattened portions 14 and 15 of the shafts so that when the operating link 18 is shifted to a point wherein the flattened portions 17 of the shafts are brought into registry with the terminal portions 20, the shafts 14 and 15 together with their extending parts 16 may rotate to an inoperative position.

The laterally extending shaft parts 16 normally underlie opposite side portions of the receptacle 6, thus dividing between them the weight of said receptacle with the result that the locking device for these shafts operates with less wear and frictional resistance. Also, the paired arrangement of the parallel shafts 14 and 15 makes it possible to control them by means of the single operating link 18, and, furthermore, when the receptacle is released it falls in a truly vertical direction between the two laterally extending shaft parts, whereas if a single such shaft part were used to support the receptacle there would be a tendency to deflect the receptacle laterally when it started to fall.

The operating link 18 extends alongside the compartment 11 adjacent the floor of the fuselage and beneath the shield 21 and the sub floor of the pilot's compartment to a point adjacent the instrument panel 22. At the latter point the link terminates as a fork 23. At the back side of the instrument panel is mounted a bracket 24, and upon the bracket 24 is mounted a lever 25, said bracket serving as a fulcrum for the lever 25. One end of the lever 25 is secured to the fork 23 and the other end is secured to an operating bar 26, which extends thru the instrument panel and is provided with a handle 27 grippable by the pilot when he desires to shift the link 18 to bring its terminal portion 20 into registry with the extended or flattened portions 17 of the shafts 14 and 15. This operation permits the parts 16, due to the weight of the cargo, to rotate to an inoperative position whereupon the receptacle in the compartment may be discharged.

The parts 16 of the shafts 14 and 15 are blade-like in construction and project beneath the lower edges of the opposite walls 7 and 8 into the recesses 28 formed in the bottom wall of the receptacle 6 and form shelf-like supports for the cargo being supported.

The receptacle or mail container 6 may be built in the aeroplane at the time it is first constructed, or it may be placed therein subsequently at any time desired. However, access is provided to it at all times thru the opening 29 in the wall 7. Said opening is built in registry with the door 30 of the receptacle in order that sacks of mail may be easily stored within and removed from the receptacle.

The recesses 28 formed in the bottom wall of the receptacle serve as pockets for housing the parts 16 which project from the shafts 14 and 15 toward each other in the opening. Said parts 16, together with the remaining exposed bottom wall of the receptacle form a plane surface enclosure for the opening 5 and produce a streamline effect for the fuselage at that point. It will be seen that by utilizing the bottom of the receptacle to enclose the opening 5, the receptacle is always in a position for emergency dropping without first having to move any doors or enclosing mechanism out of the way, and this also paves the way for a quick release of the cargo housed within the compartment. If, for example, a downwardly swinging door were used to cover the opening 5, in case of accident it might be difficult to open it against the upward rush of air encountered by a falling plane.

On the top side of the receptacle 6 is mounted a parachute 31. The parachute is folded on the top of the receptacle in a manner shown in Fig. 1. It is provided with a protective covering 32. When the receptacle is once released the parachute will open and the receptacle will be landed in a manner similar to that in which the pilot lands after "bailing out" of the plane. The receptacle for the mail is constructed of fire proof material and is sufficiently buoyant to float if dropped on the water.

To aid in initiating a quick release of the container being discharged from the aeroplane I provide other mechanism which I will proceed now to describe.

The mechanism whereby a quick impetus is given to the receptacle 6 after it has once been subjected to the unrestrained force of gravity, comprises a rat-trap spring mechanism 33 of somewhat great intensity mounted upon the walls 8, 9 and 10 forming the compartment.

The mechanism 33 comprises a bent frame including a shaft 34 mounted in bearings 35 fastened to the walls 9 and 10 respectively. The shaft 34 is bent to form a loop member 36 which is caused to bear downwardly on the protective covering 32 and the top of the receptacle thru the medium of the spring 37.

The shaft 34 extends thru a bracket 38 supported by the wall 8 of the compartment and attached to said wall by means of stove bolts 39. On the protruding portion of said shaft is mounted a ratchet 40. In the end of the shaft which extends beyond the ratchet are provided openings 41 wherein may be applied the point 42 of the operating tool 43 (see Fig. 5) whereby the loop 36 may be retracted against the opposition of the spring 37 to facilitate the insertion of the receptacle in its compartment, in case the receptacle is to be replaced after having been dropped for test purposes or otherwise. In such a case it is to be understood that the aircraft has safely landed after the cargo has been discharged.

The bracket 38 is provided with two companion wings 44 and 45. The wing 44 has a boss 46 and the wing 45 has a boss 47. The boss 47 serves as a bearing for the shaft 34 and in the boss 46 I mount a stub shaft 48 by means of a dowel 49. On the shaft 48 I mount a dog 50 which engages with the teeth of the ratchet to maintain the loop 36 in retracted position. Normally the dog 50 occupies a position as dottedly indicated in Fig. 4. The dog is maintained in an operative relation to the shaft 48 by means of a collar 51. When it is desired to elevate the loop 36 against the resistance of the spring 37, the point 42 of the tool 43 is applied in one of the openings 41 and the shaft 34 is slightly rotated in a clockwise direction permitting the dog 50 to be engaged with the tooth of the ratchet 40. Then the tool 43 is removed and the point 42 is placed in the other opening 41 and the shaft 34 is given approximately a quarter turn until the proper ratchet tooth is engaged by the pawl to hold the spring retracted. The same operation is carried out with each spring.

When the receptacle 6 is installed in its compartment and the parachute 31 is folded and the protective covering 32 is applied, the shafts 34 are given a slight turn permitting the dog 50 to be detached from the pawl and assume the dotted position whence each spring exerts its full force on the receptacle 6. The tool 43 is also used to rotate the shafts 14 and 15 into positions wherein the link 18 may be advanced, thereby bringing the portions 17 of said shafts into locking engagement with the slots 19. In order to make it possible to adjust the shafts 14 and 15 with the tool 43, I provide holes 52 wherein the point 42 of the tool may be inserted. It is to be understood that when the shafts 14 and 15 are rotated to the positions shown in Fig. 1, the frictional resistance of said shafts in their bearings will be sufficient to maintain the blades 16 in the horizontal positions until the link 18 can be operated to shift it into its locking engagement with the flattened portions of said shafts. The link 18 is maintained in engagement with the ends of the shafts 14 and 15 by means of an angle beam 53, fastened to the floor of the fuselage.

From the foregoing description the operation of the device will be obvious.

We claim:

1. Aircraft having an opening in the floor of the body thereof, and walls surrounding said opening forming a compartment, means to support a receptacle in said compartment for subsequent ejection, said means comprising oppositely disposed shafts having laterally extending supports positioned to share between them the weight of said receptacle which project beneath the walls of the compartment into the space above said opening, locking means engageable with the body portions of said shafts to lock them against rotation and thereby hold said supports in supporting position, and means to convert said locking means into a releasing means whereby said receptacle under the influence of gravity may drop from said compartment.

2. Aircraft having an opening in the floor of the body thereof and walls surrounding said opening forming a compartment, means to support a receptacle in said compartment for premature ejection, said means comprising oppositely disposed shafts having blade-like supports positioned to share between them the weight of said receptacle which project beneath the walls of the compartment into the space above said opening, locking means engageable with the body portions of said shafts to lock them against rotation and thereby hold said blade-like supports in supporting position, and means to shift said locking means to a position wherein said means is converted into a releasing means.

3. In combination, an aircraft having a fuselage with a floor portion having an opening therethru, a horizontally extending shaft turnably mounted upon the craft adjacent to said opening, said shaft having a blade portion which projects radially therefrom into a portion of said opening in one position of said shaft to form a support for an object positioned to gravitate thru said opening, said shaft having a flattened portion, a link provided with an aperture having a narrowed portion to engage the flattened portion of said shaft normally to prevent a turning movement of said shaft, said shaft extending transversely of the craft and said link extending lengthwise thereof and in engagement therewith and means located in the front portion of the craft to move said link longitudinally, said aperture having an enlarged part which by the longitudinal movement of the link is brought into register with the flattened portion of said shaft to release the blade portion of the shaft from its aforesaid supporting position.

4. An aircraft having an opening in the floor of the body thereof and walls surrounding said opening thereby forming a compartment thereabove, two oppositely disposed substantially parallel shafts turnably mounted upon the aircraft body adjacent to opposite sides of said opening, each of said shafts having a laterally extending part projecting over said opening thereby forming cooperating supports to sustain a receptacle adapted to fall thru said opening, and an elongated locking member having an operative engagement with said shafts and extending at substantially a right angle to them, said member having a locking relation to said shafts in one of its longitudinal positions and a releasing relation to them in another longitudinal position, and means to shift said member manually from the locking position to the releasing position.

5. The subject matter of claim 4 and, said shafts each having a flattened portion and said locking member consisting of a link having for each said shaft an aperture with a narrowed portion normally engaging the flattened portion of such shaft to prevent a turning movement thereof, said aperture having an enlarged part which when said link is shifted to releasing position is brought into register with the flattened portion of such shaft.

ALBERT A. SCHWERIN.
STANLEY J. BENTLEY.